US012573085B2

(12) United States Patent
He et al.

(10) Patent No.: US 12,573,085 B2
(45) Date of Patent: Mar. 10, 2026

(54) OBJECT POSE RECOGNITION METHOD BASED ON TRIANGULATION AND PROBABILITY WEIGHTED RANSAC ALGORITHM

(71) Applicant: ZHEJIANG UNIVERSITY, Hangzhou (CN)

(72) Inventors: Zaixing He, Hangzhou (CN); Xinyue Zhao, Hangzhou (CN); Chentao Shen, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 347 days.

(21) Appl. No.: 18/028,528

(22) PCT Filed: Jan. 8, 2021

(86) PCT No.: PCT/CN2021/070900
§ 371 (c)(1),
(2) Date: Mar. 25, 2023

(87) PCT Pub. No.: WO2022/147774
PCT Pub. Date: Jul. 14, 2022

(65) Prior Publication Data
US 2023/0360262 A1 Nov. 9, 2023

(51) Int. Cl.
*G06T 7/73* (2017.01)

(52) U.S. Cl.
CPC ...... *G06T 7/74* (2017.01); *G06T 2207/20076* (2013.01)

(58) Field of Classification Search
CPC ... G06T 2207/20076; G06T 7/74; G06T 7/73; G06T 7/77
(Continued)

(56) References Cited

U.S. PATENT DOCUMENTS

2019/0362178 A1 11/2019 Huang et al.

FOREIGN PATENT DOCUMENTS

| CN | 106295710 A | * | 1/2017 | .......... G06K 9/4604 |
| CN | 106548493 A | * | 3/2017 | |

(Continued)

*Primary Examiner* — Chineyere Wills-Burns
*Assistant Examiner* — Emmanuel Silva-Avina
(74) *Attorney, Agent, or Firm* — Jiwen Chen; Joywin IP Law PLLC

(57) ABSTRACT

The present invention discloses an object pose recognition method based on triangulation and a probability weighted RANSAC algorithm. First, an actual image and a template image are photographed as input, foreground parts of the input images are extracted, feature points are extracted by means of an SIFT algorithm, the feature points of the actual image and the template image are matched, and each pair of feature points is numbered. Then, the actual image is triangulated, serial numbers of the feature points at vertexes of each triangle are recorded, and the feature points are reconnected into triangles in the model image according to the serial numbers of the points. Next, each feature point is assigned with a certain probability according to intersections of line segments around the feature point. Finally, when a RANSAC algorithm is used, four feature points are probabilistically selected to calculate a spatial transformation matrix, an error generated by the spatial transformation matrix is calculated, and when the error satisfies a set condition, the matrix is the calculated spatial transformation matrix. The present invention can calculate an accurate object pose, achieve higher efficiency, and meet the requirements of practical application.

6 Claims, 5 Drawing Sheets

(58) Field of Classification Search
USPC ......................................................... 382/103
See application file for complete search history.

(56)                    References Cited

FOREIGN PATENT DOCUMENTS

| | | | | | |
|---|---|---|---|---|---|
| CN | 109493384 | A | * | 3/2019 | ........... G06K 9/6201 |
| CN | 110147809 | A | * | 8/2019 | ........... G06K 9/6211 |
| CN | 111553395 | A | | 8/2020 | |
| CN | 111768478 | A | | 10/2020 | |

* cited by examiner

Probability weighted RANSAC algorithm (detailed)

| Number        of feature points | Average    number    of intersections | Probability assignment (selected probability) |
|---|---|---|
| 1 | 0 | 0.15 |
| 2 | 2 | 0.1 |
| 3 | 0 | 0.15 |
| 4 | 3 | 0.075 |
| 5 | 2 | 0.1 |
| 6 | 6 | 0 |
| 7 | 0 | 0.1 |
| 8 | 4 | 0.05 |
| 9 | 3 | 0.075 |
| 10 | 0 | 0.15 |
FIG. 5
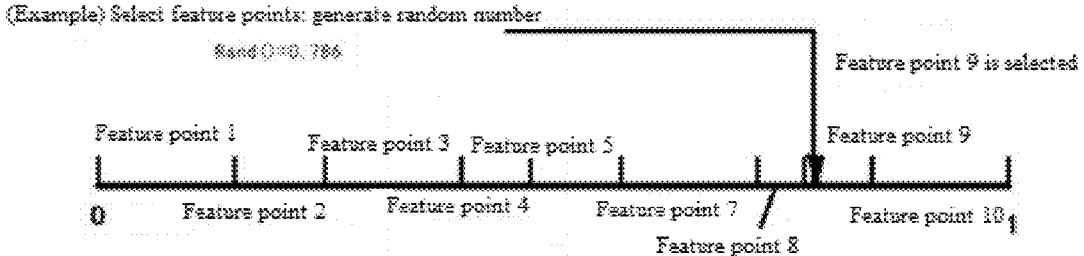
FIG. 6
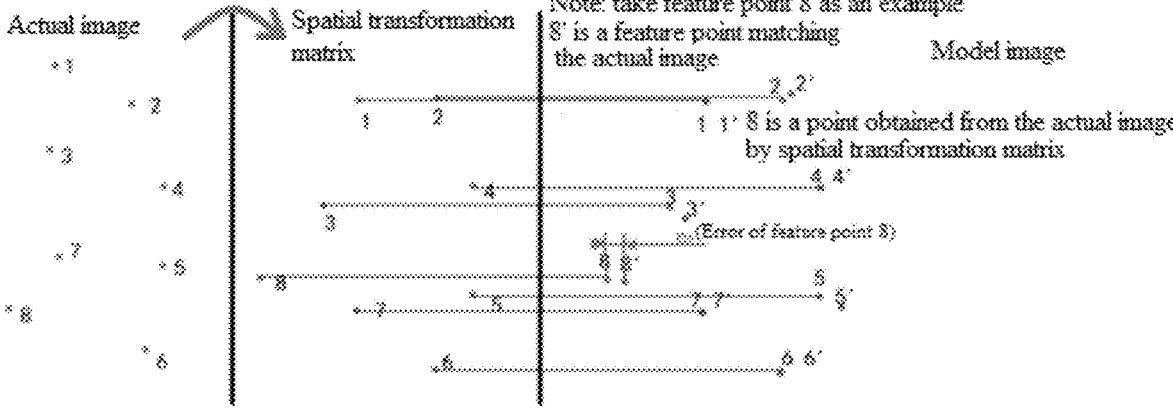
FIG. 7

OBJECT POSE RECOGNITION METHOD BASED ON TRIANGULATION AND PROBABILITY WEIGHTED RANSAC ALGORITHM

This is a U.S. national stage application of PCT Application No. PCT/CN2021/070900 under 35 U.S.C. 371, filed Jan. 8, 2021 in Chinese, all of which is hereby incorporated by reference.

FIELD OF THE INVENTION

The present invention relates to the field of machine vision, in particular to an object pose recognition method based on triangulation and a probability weighted RANSAC algorithm.

BACKGROUND OF THE INVENTION

Object pose recognition has always been an important research direction in the fields of machine vision and industrial automation. Object pose recognition is used in many application scenarios, such as autonomous operation of robots in unstructured environments, augmented reality, and virtual assembly.

For object pose recognition, the most commonly used method is to extract image feature points (such as Scale-Invariant Feature Transform (SIFT) or Speeded Up Robust Features (SURF)) from a template image and an actual image for matching. Because the matching of feature points usually leads to mismatching, four correct feature point matching pairs shall be selected later by using a random sample consensus (RANSAC) algorithm to accurately calculate a spatial transformation matrix between the two images, so as to calculate the pose of an object. The specific practice of the RANSAC algorithm is as follows: four matching feature point pairs are randomly sampled each time to calculate the spatial transformation matrix; and when a large number of point pairs among the remaining feature point pairs conform to the transformation relationship of the transformation matrix within a given error range, the corresponding four point pairs are considered as correct matching point pairs, and the transformation matrix is also the required matrix. On the contrary, four point pairs are randomly reselected until correct point pairs are selected and a correct transformation matrix is calculated. However, the method works better when the ratio of wrong matching point pairs is relatively low. When the ratio of wrong matching point pairs is relatively high (more than 50%), the method needs many cycles to calculate a correct transformation matrix, which seriously affects the efficiency of object pose recognition. However, when the ratio of wrong matching point pairs is further increased to a certain extent (more than 80%), a correct transformation matrix cannot be calculated in a reasonable time.

Aiming at this problem, the present invention provides a new object pose recognition method based on triangulation and a probability weighted RANSAC algorithm. Its main idea is as follows: a topological network of all feature points on the same image is constructed by triangulation, a probability of matching error of feature point pairs is analyzed and calculated by comparing the difference between the topological networks of feature points of two images, and the probability is weighted to a random process of a RANSAC algorithm, where the probability that the feature point pairs with a higher error probability are randomly selected to calculate a transformation matrix as four point pairs is lower. This method can effectively improve the efficiency and success rate of the transformation matrix and subsequent object pose recognition.

SUMMARY OF THE INVENTION

In order to solve the deficiencies of the above-mentioned method under a relatively high error rate of feature point pairs, the present invention provides an object pose recognition method based on triangulation and a probability weighted RANSAC algorithm, provides a new probability weighting method for feature point pairs based on triangulation, and improves an RANSAC method, such that correct feature point pairs can be selected more easily to meet the requirements of practical application.

As shown in FIG. 1, the technical solution of the present invention includes the following steps:

Step 1: image acquiring. An actual object placed in different actual environments is photographed by an actual physical camera to obtain an actual image; an object model imported in a computer virtual scenario is photographed by a virtual camera to obtain a template image; foreground parts of the input actual image and template image are extracted;

Step 2: detecting and matching of image feature points. Feature points of the actual image and the template image are detected by using an SIFT algorithm, and the feature points of the actual image and the template image are matched;

Step 3: triangulating. The feature points matched successfully in step 2 are selected from the actual image, and feature point pairs where the feature points are located are numbered. These feature points are triangulated, and serial numbers of the feature points at vertices of each triangle are recorded. A corresponding serial number of each feature point is found from the model image, and the feature points are reconnected into triangles according to the serial numbers of the points;

Step 4: calculating the number of intersections.

4.1. A line segment derived from each feature point (a1, b1) in the model image can be represented by a vector m=(a, b), and then whether the line segment intersects with other line segments is determined. Fast determination is performed first, assuming that two endpoints of the first line segment are $A(a_x, a_y)$ and $B(b_x, b_y)$, and two endpoints of the second line segment are $C(c_x, c_y)$ and $D(d_x, d_y)$. If $\max(a_x, b_x)<\min(c_x, d_x)$ or $\max(a_y, b_y)<\min(c_y, d_y)$ or $\max(c_x, d_x)<\min(a_x, b_x)$ or $\max(c_y, d_y)<\min(a_y, b_y)$, it can be determined that the two line segments do not intersect.

Second, four points are connected by the vectors, and if the line segments satisfy the following condition at the same time, it indicates that the line segments intersect:

$$(\overrightarrow{AB}\times\overrightarrow{AC})\cdot(\overrightarrow{AB}\times\overrightarrow{AD})\leq0$$

$$(\overrightarrow{CD}\times\overrightarrow{CA})\cdot(\overrightarrow{CD}\times\overrightarrow{CB})\leq0$$

Finally, if a line segment intersects with others, the sum number of the line segment derived from the feature point is increased by 1, and after all other line segments are traversed, the total number of intersections between the line segment derived from the feature point and other line segments can be obtained.

4.2. After the numbers of intersections of all line segments derived from the feature point are calculated, the numbers of intersections are summed and divided by the number of the derived line segments to obtain an average number of intersections of each line segment, which is called the number of intersections of the feature point.

Step 5: probability assigning. The feature points in the model image are sorted from low to high according to the corresponding number of intersections. For the number of intersections of each feature point, a score is calculated by subtracting the number of intersections of the feature point from the maximum number of intersections. A probability of each feature point is the score of the feature point divided by the total score of all feature points, where the sum of probabilities of all the feature points is 1;

Step 6: using probability weighted RANSAC algorithm.

6.1. Four feature point pairs are selected according to the probabilities. An interval of 0-1, the length of which is the probability of each feature point is generated. A random number of 0-1 is randomly generated. If the random number falls in a certain interval, it represents that the feature point corresponding to the interval is selected. If the interval is repeated, the feature point is re-selected.

6.2. Pose calculation and deviation calculation. A spatial transformation matrix T is calculated by using the coordinates of the four feature points and matching feature points. For each feature point of the actual image, its coordinates $(x_1, y_1)$ are multiplied by the matrix T to obtain coordinates $(x_1', y_1')$ after pose transformation, and the Euclidean distance between the coordinates and the coordinates $(x_2, y_2)$ of the corresponding feature point on the model image is the deviation of spatial transformation of the pair of feature points.

$$\begin{pmatrix} u \\ v \\ w \end{pmatrix} = \begin{pmatrix} x_1 \\ y_1 \\ 1 \end{pmatrix} * T$$

$$\begin{pmatrix} x_1' \\ y_1' \end{pmatrix} = \frac{1}{w}\begin{pmatrix} u \\ v \end{pmatrix} e = \sqrt{(x_1' - x_2)^2 + (y_1' - y_2)^2}$$

6.3. Deviation analysis. If the deviation e of each pair of feature points is smaller than a threshold, it indicates successful correspondence. If the number of point pairs in successful correspondence exceeds a set number, it indicates that the spatial transformation matrix is a feasible solution, otherwise, step 6 is repeated until a feasible solution appears, or the flow ends automatically after reaching a certain number of cycles.

The flow is shown in FIG. 2.

The present invention has the following beneficial effects:

1) The present invention solves the problems of low efficiency and low success rate of a traditional pose recognition method under a relatively high error rate of feature points.

2) The present invention improves a conventional RANSAC algorithm, and makes the RANSAC algorithm more efficiently select points with relatively high accuracy through probability weighting, so as to improve the effectiveness of the RANSAC algorithm.

3) The present invention popularizes a method for eliminating mismatching of feature points, and uses triangulation and intersection number detection to remove mismatching feature points.

4) The present invention solves the problem of low efficiency and accuracy of the traditional pose recognition method when the surrounding environment is complex or the surrounding environment has obvious features. The present invention can effectively eliminate disturbing features in the environment and improve recognition efficiency and accuracy.

BRIEF DESCRIPTION OF THE DRAWINGS

FIG. 5 is an example diagram of probability assignment;

FIG. 6 is a schematic diagram of selection of feature points.

FIG. 7 is a schematic diagram of error calculation of feature points.

DETAILED DESCRIPTION OF THE EMBODIMENTS

Figure 1:
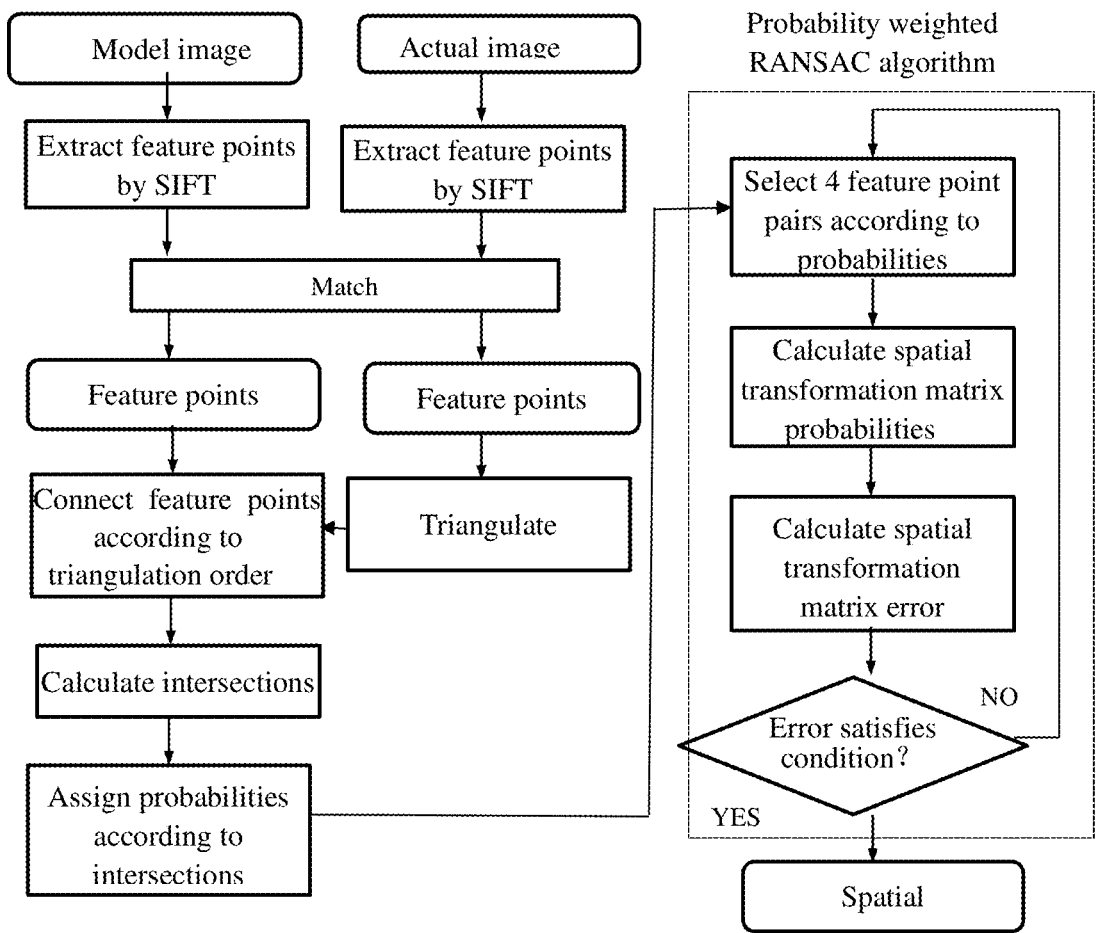
FIG. 1 is a flowchart of a method of the present invention.
Figure 2:
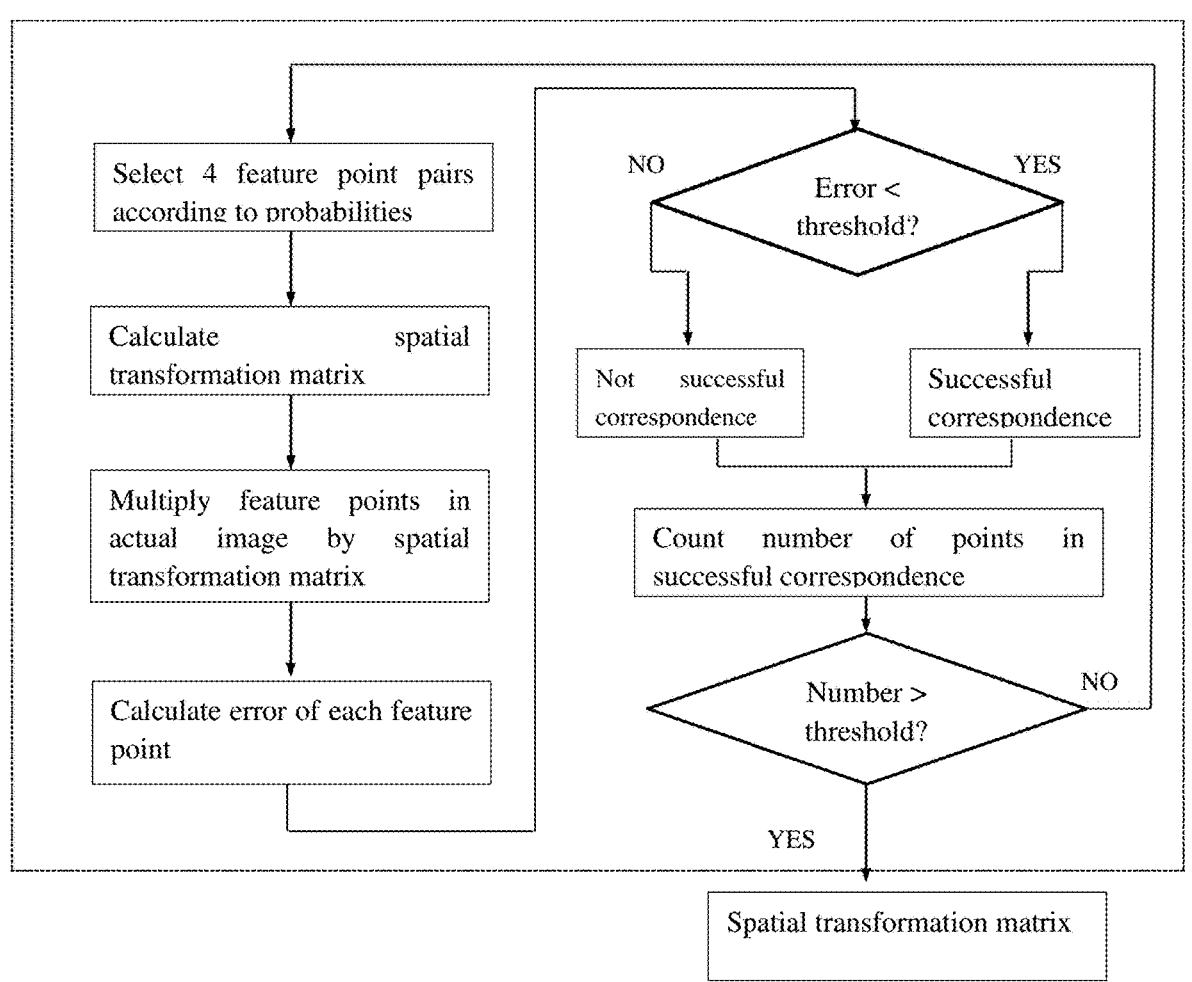
FIG. 2 is a flowchart of a probability weighted RANSAC algorithm.

The present invention will be further illustrated below in conjunction with the accompanying drawings and embodiments. The flowchart of the present invention is shown in FIG. 1.

A specific embodiment of the present invention and an implementation process thereof are as follows:

The embodiment is implemented in different poses of a book.

Figure 3:
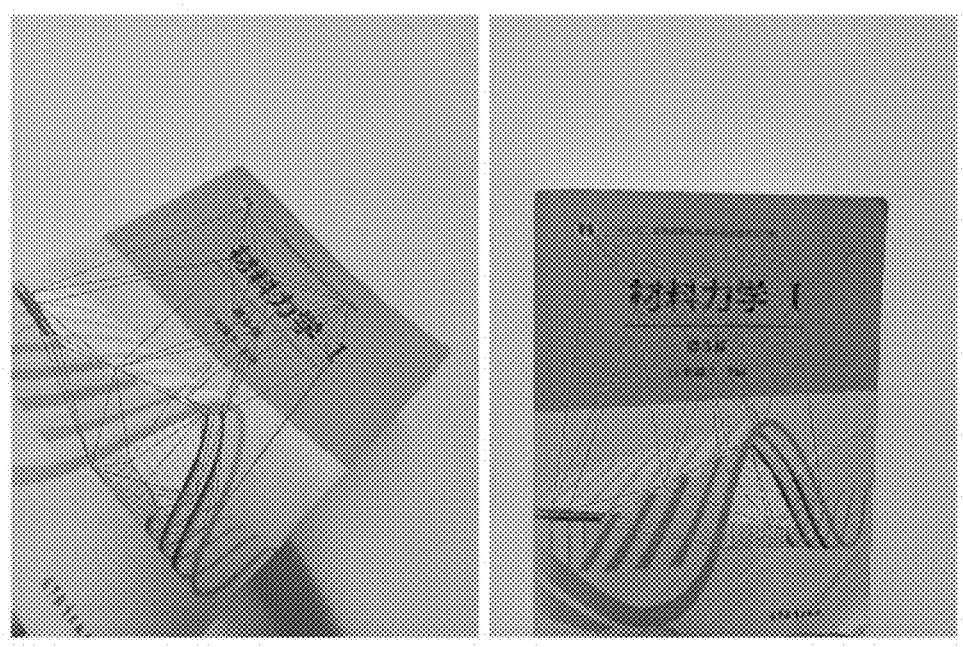
FIG. 3 is a result diagram of triangulation and connection.

Step 1: an actual object placed in different actual environments is photographed by an actual physical camera to obtain an actual image; an object model imported in a computer virtual scenario is photographed by a virtual camera to obtain a template image; foreground parts of the input actual image and template image are extracted;

Step 2: detecting and matching of image feature points. Feature points of the actual image and the template image are detected by using an SIFT algorithm, and the feature points of the actual image and the template image are matched;

Step 3: triangulating. The feature points matched successfully are triangulated in the actual image, serial numbers of the feature points at vertices of each triangle are recorded, and the feature points are reconnected into triangles in the model image according to the serial numbers of the points;

As shown in FIG. 3, the left shows triangulation results of the actual image, and the right shows an image of a model picture connected according to the serial numbers of points.

Step 4: calculating the number of intersections. Intersections between a line segment derived from each feature point and other line segments in the model image are calculated, and an average number of intersections of each line segment derived is calculated as the number of intersections of the feature point.

Figure 4:
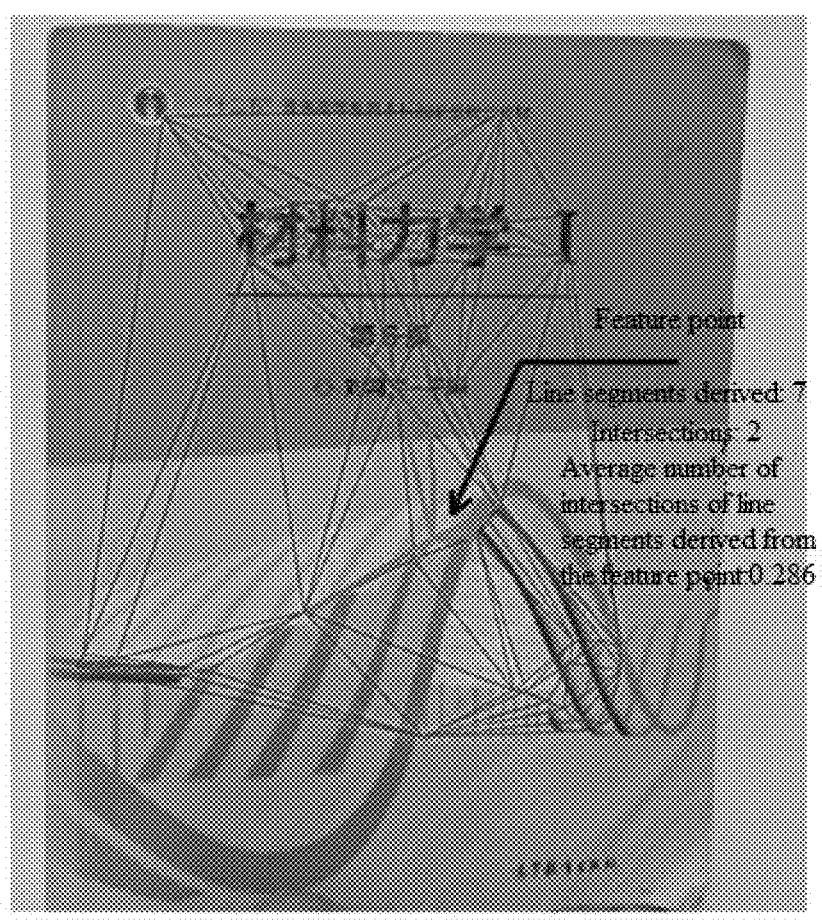
FIG. 4 is a diagram illustrating calculation of the number of intersections.

As shown in FIG. 4, seven line segments are derived from a feature point, and the total number of intersections with other lines is 2, so it can be obtained that the average number of intersections of the line segment derived from the feature point is 0.286.

Step 5: probability assigning. The feature points in the model image are sorted from low to high according to the corresponding number of intersections. Then, a feature point pair corresponding to each feature point is assigned with a probability value. If the number of intersections is smaller, the probability assigned is higher, where the sum of the probabilities is 1.

FIG. 5 is a schematic diagram of probability assignment. In step 6:

6.1. Selecting four feature points according to the probabilities. An interval of 0-1, the length of which is the probability of each feature point is generated. A random number of 0-1 is randomly generated. If the random number falls in a certain interval, it represents that the feature point corresponding to the interval is selected. If the interval is repeated, the feature point is re-selected.

The feature points are selected as shown in FIG. 6.

6.2. Pose calculating and deviation calculating. A spatial transformation matrix T is calculated by using the coordinates of the four feature points and matching feature points. For each feature point of the actual image, a deviation of its spatial transformation is calculated.

FIG. 7 is a schematic diagram of deviation calculation.

6.3. Deviation analyzing. If the deviation e of each pair of feature points is smaller than a threshold, it indicates successful correspondence. If the number of point pairs in successful correspondence exceeds a set number, it indicates that the spatial transformation matrix is a feasible solution, otherwise, step 6 is repeated until a feasible solution appears, or the flow ends automatically after reaching a certain number of cycles.

Figure 8:
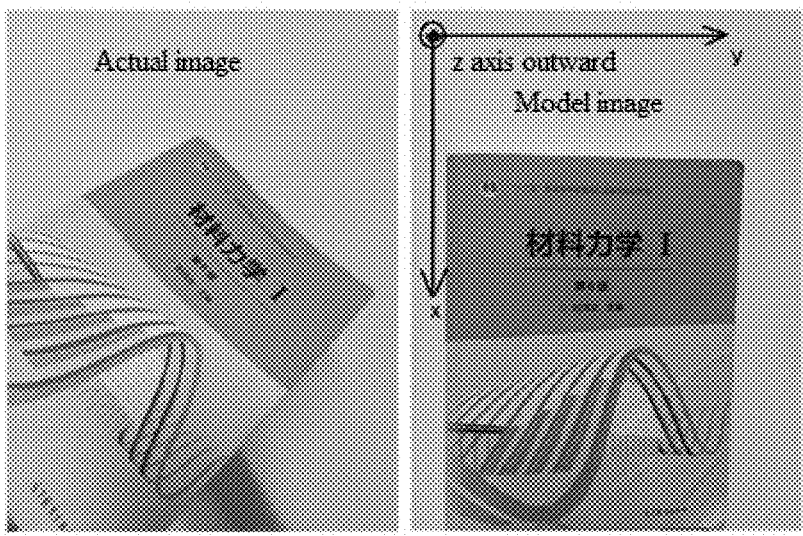
FIG. 8 is a schematic diagram of a selection case and coordinate axes.

In this example (FIG. 8), the spatial transformation matrix calculated by the above steps is:

$$T = \begin{bmatrix} 0.6674 & -0.9804 & -0.00021438 \\ 0.9176 & 0.9166 & 0.00019614 \\ -340.6326 & 435.5420 & 1 \end{bmatrix}$$

The matrix is a homography matrix, and a rotation matrix R and a vector t of object translation can be calculated by decomposing the homography matrix. The points of the model image are denoted on a plane of aX+bY+cZ=d. A normal vector is $n^T$. An internal parameter matrix of the camera is K.

$$K^{-1}TK = \left(R + \frac{1}{d}tn^T\right)$$

The solution of the translation vector is the distance of translation. For the rotation matrix R, angles of rotation about three axes are:

$\theta_x = \text{atan } 2(R_{32}, R_{33})$ $\theta_y = \text{atan } 2(-R_{31}, \sqrt{R_{32}^2 + R_{33}^2})$ $\theta_z = \text{atan } 2(R_{21}, R_{11})$ Finally, after calculation, the object rotates −16.7° about x axis, −29.8° about y axis, and −36.7° about z axis relative to the model. The object moves about 9 cm in the x direction, about 12 cm in the y direction, and about 9.5 cm in the z direction. The results are close to the actual measurement results.

The above are only specific embodiments of the present invention, but the technical features of the present invention are not limited thereto. Any simple changes, equivalent substitutions or modifications based on the present invention in order to solve basically the same technical problems and achieve basically the same technical effects fall into the protection scope of the present invention.

The invention claimed is:

1. A computer-implemented object pose recognition method based on triangulation and a probability weighted RANSAC algorithm, wherein step 1: image acquiring: photographing an actual object placed in different actual environments by an actual physical camera to obtain an actual image; photographing an object model imported in a computer virtual scenario by a virtual camera to obtain a template image; extracting foreground parts of the input actual image and template image;

step 2: detecting and matching image feature points: detecting feature points of the actual image and the template image by using an SIFT algorithm, and matching the feature points of the actual image and the template image;

step 3: triangulating: triangulating the feature points matched successfully in the actual image, recording serial numbers of the feature points at vertices of each triangle, and reconnecting the feature points into triangles in the model image according to the serial numbers of the points, specifically: selecting the feature points matched successfully in step 2 from the actual image, and numbering feature point pairs where the feature points are located; triangulating these feature points, and recording serial numbers of the feature points at vertices of each triangle; finding a corresponding serial number of each feature point from the model image, and reconnecting the feature points into triangles according to the serial numbers of the points;

step 4: calculating the number of intersections: calculating intersections between a line segment derived from each feature point and other line segments in the model image, and calculating an average number of intersections of each line segment derived as the number of intersections of the feature point;

step 5: probability assigning: sorting the feature points in the model image from low to high according to the corresponding number of intersections, and then assigning a feature point pair corresponding to each feature point with a probability value, wherein if the number of intersections is smaller, the probability assigned is higher, and wherein the sum of the probabilities is 1; and step 6: using a probability weighted RANSAC algorithm: selecting four feature point pairs according to the probabilities, calculating a spatial transformation matrix, then multiplying the coordinates of each feature point in the actual image by the matrix to obtain coordinates after pose transformation of the feature point, and calculating a deviation from the coordinates of a feature point in the model image corresponding to the feature point; if the matrix after the pose transformation is correct, then the transformed feature point is coincided with the corresponding feature point in the model image; then calculating whether the deviation meets requirements, and if so, the spatial transformation matrix being a solution, otherwise, repeating the steps previous to step 6 until a solution is calculated out or the number of cycles reaches a pre-determined number.

2. The computer-implemented object pose recognition method based on triangulation and a probability weighted RANSAC algorithm according to claim 1, wherein in step 4, the process that intersections between a line segment derived from each feature point and other line segments in the model image are calculated is specifically: the line segment derived from each feature point in the model image can be represented by a vector, and then whether the line segment intersects with other line segments is determined: a determination is performed first, assuming that two endpoints of the first line segment are $A(a_x, a_y)$ and $B(b_x, b_y)$, and two endpoints of the second line segment are $C(c_x, c_y)$ and $D(d_x, d_y)$; if $\max(a_x, b_x) < \min(c_x, d_x)$ or $\max(a_y, b_y) < \min(c_y, d_y)$ or $\max(c_x, d_x) < \min(a_x, b_x)$ or $\max(c_y, d_y) < \min(a_y, b_y)$, it can be determined that the two line segments do not intersect;

second, four points are connected by the vectors, and if the line segments satisfy the following condition at the same time, it indicates that the line segments intersect:

$$(\overrightarrow{AB} \times \overrightarrow{AC}) \cdot (\overrightarrow{AB} \times \overrightarrow{AD}) \leq 0$$

$$(\overrightarrow{CD} \times \overrightarrow{CA}) \cdot (\overrightarrow{CD} \times \overrightarrow{CB}) \leq 0;$$

finally, if a line segment intersects with others, the sum number of the line segment derived from the feature point is increased by 1, and after all other line segments are traversed, the total number of intersections between the line segment derived from the feature point and other line segments can be obtained; and the intersections of all the traversed line segments derived from the feature point are the intersections of the line segment derived from the feature point and other line segments.

3. The computer-implemented object pose recognition method based on triangulation and a probability weighted RANSAC algorithm according to claim 1, wherein in step 4, the process that an average number of intersections of each line segment derived is calculated as the number of intersections of the feature point is specifically: for a feature point, all line segments derived from the feature point are found, the number of intersections of each derived line segment and all other line segments is calculated by using the above method, and after the numbers of intersections of all the line segments derived from the feature point are found, the numbers of intersections are summed and divided by the number of the derived line segments to obtain an average number of intersections of each line segment, which is called the number of intersections of the feature point.

4. The computer-implemented object pose recognition method based on triangulation and a probability weighted RANSAC algorithm according to claim 1, wherein in step 5, the process that a feature point pair corresponding to each feature point is assigned with a probability value, wherein if the number of intersections is smaller, the probability assigned is higher, and wherein the sum of the probabilities is 1 is specifically: a score is calculated according to the number of intersections of each feature point in step 4 by subtracting the number of intersections of the feature point from the maximum number of intersections, and the probability of each feature point is the score of the feature point divided by the total score of all feature points.

5. The computer-implemented object pose recognition method based on triangulation and a probability weighted RANSAC algorithm according to claim 1, wherein step 6 is specifically:

(6a) selecting four feature points according to the probabilities: an interval of 0-1, the length of which is the probability of each feature point is generated; a random number of 0-1 is randomly generated; if the random number falls in a certain interval, it represents that the feature point corresponding to the interval is selected; if the interval is repeated, the feature point is reselected;

(6b) pose calculating and deviation calculating: a spatial transformation matrix T is calculated by using the coordinates of the four feature points and matching feature points; for each feature point of the actual image, its coordinates $(x_1, y_1)$ are multiplied by the matrix T to obtain coordinates $(x_1', y_1')$ after pose transformation, and the Euclidean distance between the coordinates and the coordinates $(x_2, y_2)$ of the corresponding feature point on the model image is the deviation of spatial transformation of the pair of feature points;

$$\begin{pmatrix} u \\ v \\ w \end{pmatrix} = \begin{pmatrix} x_1 \\ y_1 \\ 1 \end{pmatrix} * T$$

$$\begin{pmatrix} x_1' \\ y_1' \end{pmatrix} = \frac{1}{w}\begin{pmatrix} u \\ v \end{pmatrix} e = \sqrt{(x_1' - x_2)^2 + (y_1' - y_2)^2}$$

(6c) deviation analyzing: if the deviation e of each pair of feature points is smaller than a threshold, it indicates successful correspondence; if the number of point pairs in successful correspondence exceeds a set number, it indicates that the spatial transformation matrix is a feasible solution, otherwise, step 6 is repeated until a feasible solution appears, or the flow ends automatically after reaching a pre-determined number of cycles.

6. A computer-implemented object pose recognition method based on triangulation and a probability weighted RANSAC algorithm, wherein step 1: image acquiring: photographing an actual object placed in different actual environments by an actual physical camera to obtain an actual image; photographing an object model imported in a computer virtual scenario by a virtual camera to obtain a template image; extracting foreground parts of the input actual image and template image;

step 2: detecting and matching image feature points: detecting feature points of the actual image and the template image by using an SIFT algorithm, and matching the feature points of the actual image and the template image;

step 3: triangulating: triangulating the feature points matched successfully in the actual image, recording serial numbers of the feature points at vertices of each triangle, and reconnecting the feature points into triangles in the model image according to the serial numbers of the points, specifically: selecting the feature points matched successfully in step 2 from the actual image, and numbering feature point pairs where the feature points are located; triangulating these feature points, and recording serial numbers of the feature points at vertices of each triangle; finding a corresponding serial number of each feature point from the model image, and reconnecting the feature points into triangles according to the serial numbers of the points;

step 4: calculating the number of intersections: calculating intersections between a line segment derived from each feature point and other line segments in the model image, and calculating an average number of intersections of each line segment derived as the number of intersections of the feature point;

step 5: probability assigning: sorting the feature points in the model image from low to high according to the corresponding number of intersections, and then assigning a feature point pair corresponding to each feature point with a probability value, wherein if the number of intersections is smaller, the probability assigned is higher, and wherein the sum of the probabilities is 1; and step 6: using a probability weighted RANSAC algorithm: selecting four feature point pairs according to the probabilities, calculating a spatial transformation matrix, then multiplying the coordinates of each feature point in the actual image by the matrix to obtain coordinates after pose transformation of the feature point, and calculating a deviation from the coordinates of a feature point in the model image corresponding to the feature point; if the matrix after the pose transformation is correct, then the transformed feature point is coincided with the corresponding feature point in the model image; then calculating whether the deviation meets requirements, and if so, the spatial transformation matrix being a solution, otherwise, repeating the steps previous to step 6 until a solution is calculated out or the number of cycles reaches a pre-determined number;

wherein in step 4, the process that intersections between a line segment derived from each feature point and other line segments in the model image are calculated is specifically: the line segment derived from each feature point in the model image can be represented by a vector, and then whether the line segment intersects with other line segments is determined: a determination is performed first, assuming that two endpoints of the first line segment are $A(a_x, a_y)$ and $B(b_x, b_y)$, and two endpoints of the second line segment are $C(c_x, c_y)$ and $D(d_x, d_y)$; if $\max(a_x, b_x) < \min(c_x, d_x)$ or $\max(a_y, b_y) < \min(c_y, d_y)$ or $\max(c_x, d_x) < \min(a_x, b_x)$ or $\max(c_y, d_y) < \min(a_y, b_y)$, it can be determined that the two line segments do not intersect;

second, four points are connected by the vectors, and if the line segments satisfy the following condition at the same time, it indicates that the line segments intersect:

$$(\overrightarrow{AB} \times \overrightarrow{AC}) \cdot (\overrightarrow{AB} \times \overrightarrow{AD}) \leq 0$$

$$(\overrightarrow{CD} \times \overrightarrow{CA}) \cdot (\overrightarrow{CD} \times \overrightarrow{CB}) \leq 0;$$

finally, if a line segment intersects with others, the sum number of the line segment derived from the feature point is increased by 1, and after all other line segments are traversed, the total number of intersections between the line segment derived from the feature point and other line segments can be obtained; and the intersections of all the traversed line segments derived from the feature point are the intersections of the line segment derived from the feature point and other line segments;

wherein in step 4, the process that an average number of intersections of each line segment derived is calculated as the number of intersections of the feature point is specifically: for a feature point, all line segments derived from the feature point are found, the number of intersections of each derived line segment and all other line segments is calculated by using the above method, and after the numbers of intersections of all the line segments derived from the feature point are found, the numbers of intersections are summed and divided by the number of the derived line segments to obtain an average number of intersections of each line segment, which is called the number of intersections of the feature point;

wherein in step 5, the process that a feature point pair corresponding to each feature point is assigned with a probability value, wherein if the number of intersections is smaller, the probability assigned is higher, and wherein the sum of the probabilities is 1 is specifically: a score is calculated according to the number of intersections of each feature point in step 4 by subtracting the number of intersections of the feature point from the maximum number of intersections, and the probability of each feature point is the score of the feature point divided by the total score of all feature points;

wherein step 6 is specifically:

(6a) selecting four feature points according to the probabilities: an interval of 0-1, the length of which is the probability of each feature point is generated; a random number of 0-1 is randomly generated; if the random number falls in a certain interval, it represents that the feature point corresponding to the interval is selected; if the interval is repeated, the feature point is re-selected;

(6b) pose calculating and deviation calculating: a spatial transformation matrix T is calculated by using the coordinates of the four feature points and matching feature points; for each feature point of the actual image, its coordinates $(x_1, y_1)$ are multiplied by the matrix T to obtain coordinates $(x_1', y_1')$ after pose transformation, and the Euclidean distance between the coordinates and the coordinates $(x_2, y_2)$ of the corresponding feature point on the model image is the deviation of spatial transformation of the pair of feature points;

$$\begin{pmatrix} u \\ v \\ w \end{pmatrix} = \begin{pmatrix} x_1 \\ y_1 \\ 1 \end{pmatrix} * T \qquad \begin{pmatrix} x_1' \\ y_1' \end{pmatrix} = \frac{1}{w}\begin{pmatrix} u \\ v \end{pmatrix} \qquad e = \sqrt{(x_1' - x_2)^2 + (y_1' - y_2)^2}$$

(6c) deviation analyzing: if the deviation e of each pair of feature points is smaller than a threshold, it indicates successful correspondence; if the number of point pairs in successful correspondence exceeds a set number, it indicates that the spatial transformation matrix is a feasible solution, otherwise, step 6 is repeated until a feasible solution appears, or the flow ends automatically after reaching a pre-determined number of cycles.

* * * * *